(12) United States Patent
Mitzel et al.

(10) Patent No.: US 6,402,338 B1
(45) Date of Patent: Jun. 11, 2002

(54) ENCLOSURE ILLUMINATION SYSTEM

(75) Inventors: William P. Mitzel, Westminster; Dominic T. Monteil, Sykesville; Mark T. Maclean-Blevins, Westminster; Jay S. Gamerman, Baltimore, all of MD (US)

(73) Assignee: Mitzel Machining Inc., Westminster, MD (US)

( * ) Notice: Subject to any disclaimer, the term of this patent is extended or adjusted under 35 U.S.C. 154(b) by 0 days.

(21) Appl. No.: 09/825,835

(22) Filed: Apr. 5, 2001

(51) Int. Cl.[7] ............................. F21L 13/00; F21V 33/00
(52) U.S. Cl. ....................... 362/154; 362/183; 362/253; 362/276; 362/802
(58) Field of Search ................................ 362/183, 276, 362/802, 155, 154, 253

(56) References Cited

U.S. PATENT DOCUMENTS

| | | | |
|---|---|---|---|
| 4,410,930 A | * 10/1983 | Yachabach | 362/145 |
| 4,441,143 A | * 4/1984 | Richardson, Jr. | 362/183 |
| 5,023,595 A | 6/1991 | Bennett | |
| 5,041,952 A | 8/1991 | Janda et al. | |
| 5,086,267 A | 2/1992 | Janda et al. | |
| 5,101,329 A | * 3/1992 | Doyle | 362/183 |
| 5,138,534 A | 8/1992 | Wu | |
| 5,221,891 A | 6/1993 | Janda et al. | |
| 5,231,781 A | * 8/1993 | Dunbar | 43/17.5 |
| 5,255,170 A | * 10/1993 | Plamp et al. | 362/183 |
| 5,522,540 A | 6/1996 | Surman | |
| 5,647,074 A | * 7/1997 | White, Jr. et al. | 4/664 |
| 5,813,749 A | 9/1998 | Sheldon | |
| 5,975,713 A | 11/1999 | Brothers | |
| 6,033,084 A | 3/2000 | Burke | |
| 6,102,548 A | 8/2000 | Mantle et al. | |

* cited by examiner

Primary Examiner—Thomas M. Sember
(74) Attorney, Agent, or Firm—Rosenberg, Klein & Lee (57) ABSTRACT

An enclosure illumination system (10) is provided. The enclosure illumination system (10) is mounted on an enclosure (12). The enclosure illumination system (10) includes a solar battery (16), a light element (14), and a motion sensor (18). When external light impinges upon solar battery (16), light (14) is prevented from actuating. When solar battery (16) is not exposed to external light, for example, at nighttime, light (14) may be actuated by signals transmitted by sensor (18).

20 Claims, 6 Drawing Sheets

ENCLOSURE ILLUMINATION SYSTEM

BACKGROUND OF THE INVENTION

1. Field of the Invention

The subject invention relates to an enclosure illumination system mounted on an enclosure for providing interior illumination. In particular, the present invention directs itself to an enclosure illumination system adapted for use with a mailbox, garden shed, outhouse, or other enclosure requiring interior illumination. More particularly, this invention includes a solar battery which has the function of charging a set of rechargeable batteries which have the dual function of providing a current to a lighting module and providing a current to a motion sensing element. The lighting module includes a light element, which may be a light emitting diode, light bulb, or other suitable form of illumination, the light element being actuated only when no current is generated by the solar battery. Thus, the light element is actuated only when no external light impinges upon the solar battery, for example, night time.

Further, the enclosure illumination system includes a motion sensor, which may take the form of an infrared detector or other suitable sensing apparatus. The motion sensor acts as a switching element, upon detecting motion within the enclosure, a signal is generated and transmitted to the lighting module. The light element of the lighting module is only actuated upon detection of the signal generated by the motion sensor. Additionally, this invention directs itself to an illumination system having a timer circuit. Once the light element has been actuated, it remains in an actuated state for a set period of time and is then deactuated.

Further, the subject invention relates to a method of installation for the enclosure illumination system which is simple and requires only commonly used tools and minimal technical knowledge.

2. Prior Art

Illumination enclosure systems are known in the art. In general, such prior art illumination systems include a solar battery, or solar cell, a light emitting element, rechargeable batteries, and/or an electrical or mechanical switch which may take many forms well-known in the art. In many instances, the problems of such prior art illumination systems are in that the systems may be actuated during the daytime, thus discharging and draining stored battery power when such illumination systems are not being used. Further, many prior art systems do not include timing circuits and are susceptible to unnecessary power drains. It is a purpose of the subject invention to provide an enclosure illumination system which does not permit the actuation of the light element when external light impinges upon the solar battery, and simultaneously provides a timing circuit to prevent the premature usage of stored battery power.

One such prior art illumination system is shown in U.S. Pat. No. 6,102,548. This reference is directed to a lighting system for a mailbox. The system includes a light source positioned within the interior of a mailbox. The light source is actuated by a light sensor positioned within the mailbox. If the level of ambient light sensed by the light sensor is below a predetermined level, the light source is energized to illuminate the interior of the mailbox. This system, however, does not include a timing circuit, nor does it have means for preventing the actuation of the interior light during the daytime.

Another such prior art illumination system is shown in U.S. Pat. No. 5,975,713. This reference is directed to an interior mailbox light. The system includes an illumination source controlled by a magnetic switch, the magnetic switch being mounted within the door structure. This system does not include light sensing means, a rechargeable battery, a timing circuit, or means for preventing actuation of the light during the daytime.

U.S. Pat. No. 5,813,749 shows a prior art system directed to a solar powered mailbox internal light. This system includes a solar cell charging system and rechargeable battery pack. The light source is actuated by a door switch, which is responsive to the open or closed state of the mailbox door. This system neither has a timing circuit, nor does it prevent the actuation of the interior light during the daytime.

U.S. Pat. No. 5,522,540 shows a prior art solar powered illuminated address number device and mailbox structure. This system includes a light display connected to a set of solar panels and a rechargeable battery system. Although this system is only actuated when no external light impinges upon the solar panel, the system does not include a timing circuit, thus suffering from unnecessary power drains. Further, the system is directed primarily to external illumination.

Another prior art system is shown in U.S. Pat. No. 5,138,534. This reference is directed to a solar power operated, vehicle night illuminator circuit. This prior art system includes a solar collector and an illumination element. The illumination element may not be actuated when light impinges upon the solar collector. This system, however, does not include a timing circuit for preventing the unnecessary drain of any reserve batteries.

Further, U.S. Pat. No. 5,221,891 is directed to a control circuit for a solar-powered rechargeable power source and load. This system provides a solar panel for charging a set of rechargeable batteries. The rechargeable batteries provide current to a light source and the solar panel generates a current which keeps the light source from illuminating when sufficient light impinges upon the solar panel. This system, however, is not combined with a motion sensor, nor is it designed for the illumination of an enclosure.

None of the prior art provides for a combination of elements forming an enclosure illumination system having a solar battery, light source, and motion sensor electrically connected together in order to minimize power drain on the battery reserve. Specifically, none of the prior art Patents provide for a timing circuit connected to the illumination source which prevents the unnecessary drainage of the rechargeable batteries. Nor do they provide a method for installation by an end user, for use on existing enclosure placements, which is simple and can be performed with commonly available tools with a minimum of technical expertise.

SUMMARY OF THE INVENTION

The present invention provides an enclosure illumination system which is adapted to be mounted on an enclosure. The enclosure illumination system includes a solar battery, a light source, a rechargeable power storage device, and a motion sensor. When external light, such as sunlight, impinges upon the solar battery, the light source is prevented from actuating. The solar battery simultaneously charges a set of rechargeable batteries for use in providing power when the light source is actuated.

When no external light impinges upon the solar battery, such as in the evening, the light source may be actuated by signals generated from the motion sensor. The enclosure illumination system also includes a timing circuit in order that the light source is actuated for a predetermined set period of time after the motion sensor detects motion. The period of time is variable and may be reset by the user depending upon the application of the enclosure illuminating system. For example, the "on" time for a mailbox may be 15 seconds, the "on" time for an outhouse may be 5 minutes, etc.

It is a principal objective of the subject enclosure illumination system to provide an illumination source for the interior of enclosures.

It is a further objective of the subject enclosure illumination system to provide an illumination source which is only actuated when there is no external light detected by the system.

It is a further objective of the subject invention to provide an illumination source for the interior of an enclosure which is actuated only upon the detection of motion within the enclosure.

It is a further objective of the subject invention concept to provide an illumination source for the interior of an enclosure which will only remain actuated for a set period of time.

A further objective of the present system is to provide a method for installation of the subject invention which is simple and requires little mechanical aptitude and commonly available tools.

DESCRIPTION OF THE PREFERRED EMBODIMENTS

Figure 1:
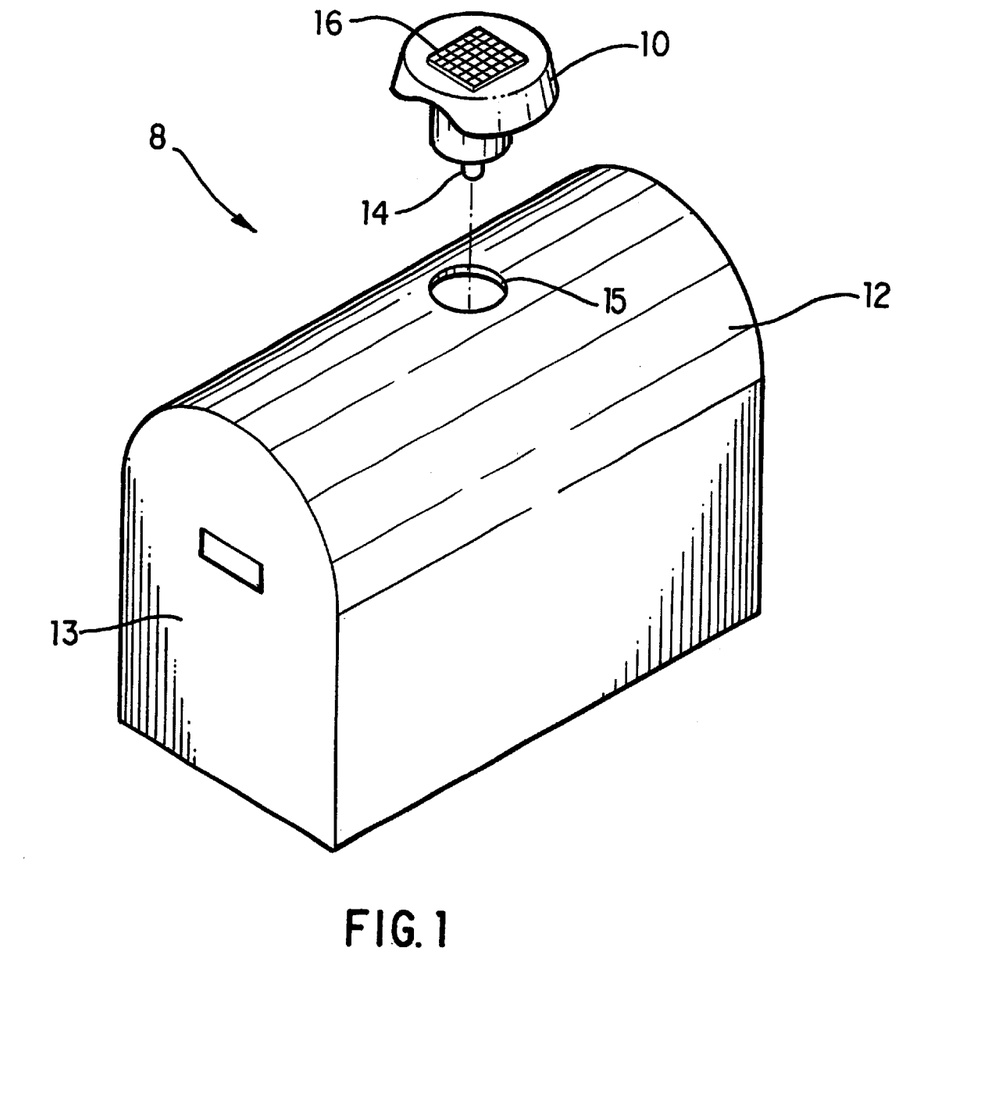
FIG. 1 is an exploded perspective view of the enclosure illumination system prior to installation on a mailbox.
Figure 2:
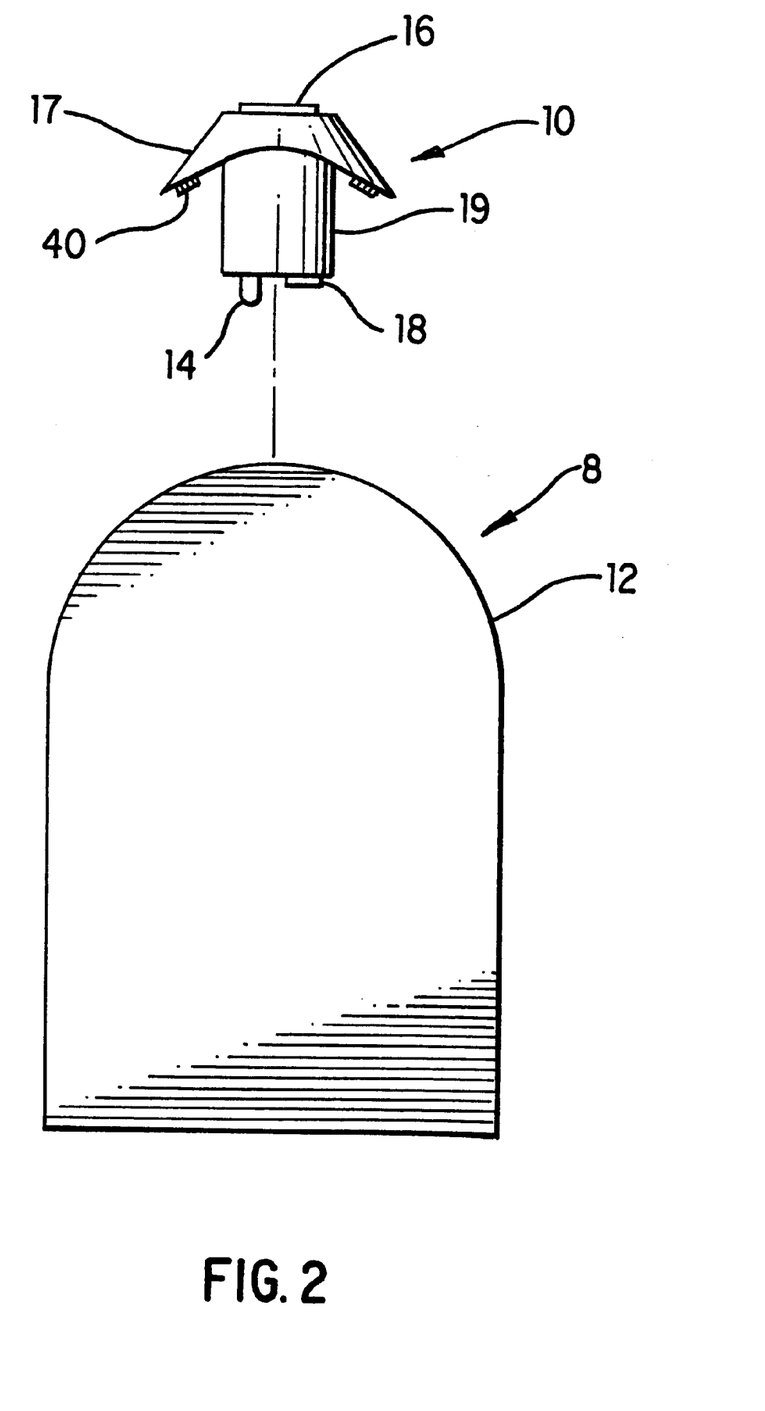
FIG. 2 is an elevational view of the enclosure illumination system prior to installation on a mailbox, showing the enclosure illumination system in further detail.

Referring now to FIGS. 1–4, there is shown an enclosure illumination system 8 which includes a housing 12 and an illumination module 10. FIGS. 1 and 2 illustrate the enclosure illumination module 10 prior to installation on a mailbox 12. The representation in the Drawings is for illustrative purposes only and represents an enclosure or other housing in general. Although FIGS. 1 and 2 illustrate the enclosure illumination system 10 being used with a mailbox 12, the system 10 may be mounted on an outhouse, tool shed, refrigerator, tent, tarp, or any other enclosure requiring illumination at nighttime.

Figure 1A:
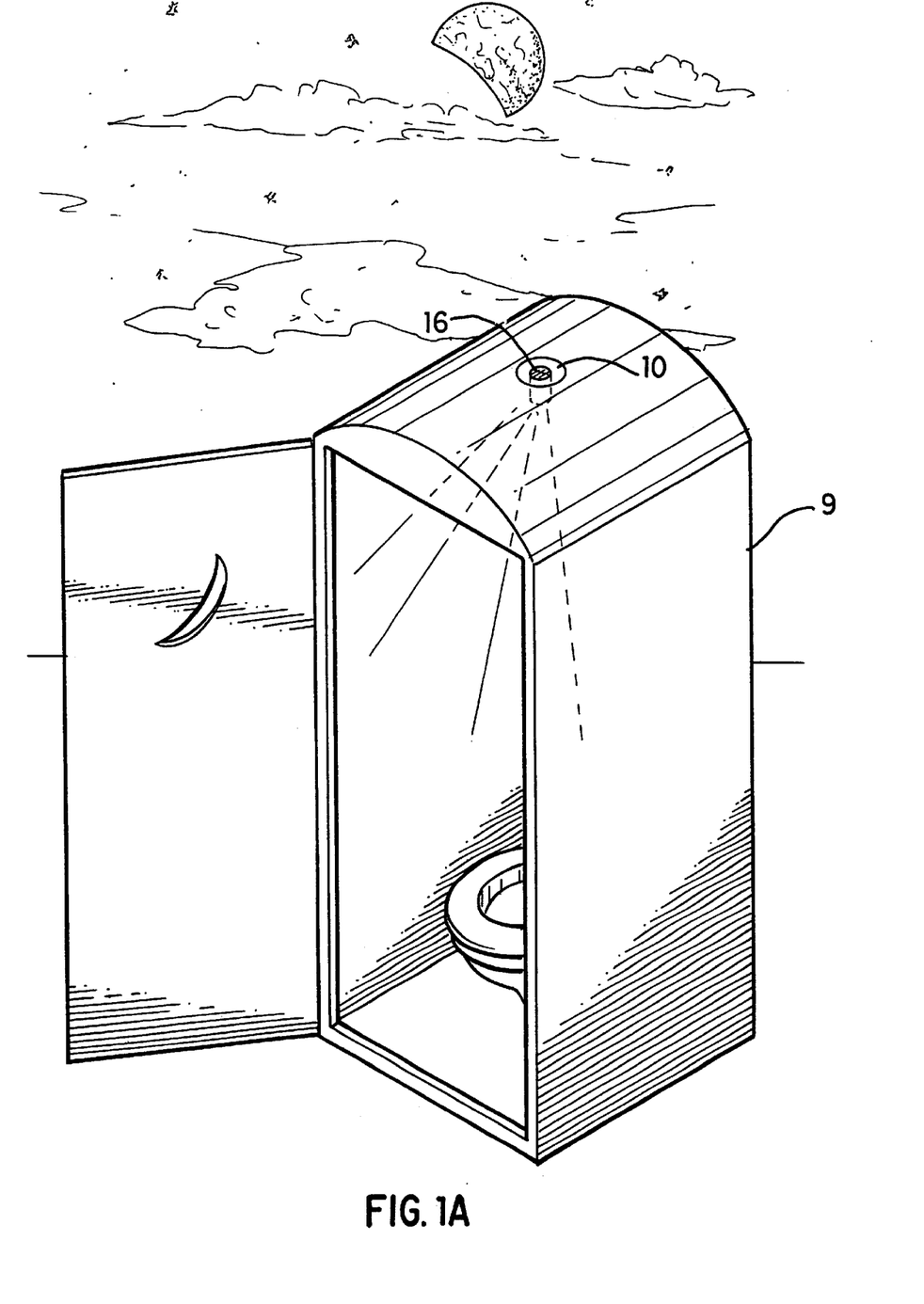
FIG. 1A is a perspective of the enclosure illumination system mounted on an outhouse.

FIG. 1A shows a perspective view of the enclosure illumination module 10 mounted on an outhouse 9. As shown, the system is operational at night time with the door to the outhouse being open. As shown in partial cut-away, the enclosure illumination module 10 is illuminating the interior of the outhouse 9.

Figure 3:
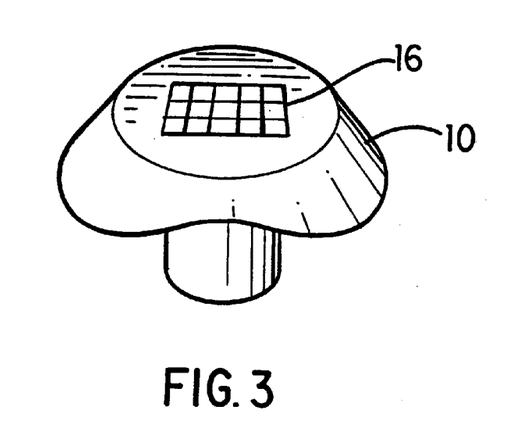
FIG. 3 is a perspective view of the enclosure illumination module.

FIG. 3 represents a perspective view of the enclosure illumination module 10. Module 10 has mounted thereon a solar battery 16. As shown, the solar battery 16 may take the form of one or more solar cells. The solar battery illuminated enclosure module 10 further includes a set of rechargeable batteries B1–B4, shown in FIGS. 5 and 7. Batteries B1–B4 may be standard nickel cadmium AA type rechargeable batteries. Batteries B1–B4, may be of type C, type D, or any other standard type of rechargeable battery. Solar battery 16 recharges rechargeable batteries B1–B4 when external light, preferably sunlight, impinges upon solar battery 16.

Figure 4:
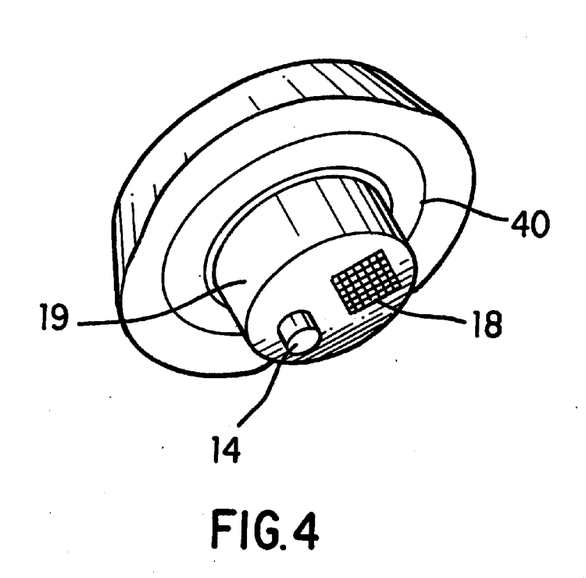
FIG. 4 is a bottom perspective view of the enclosure illumination module.

As shown in FIGS. 1, 2, and 4, the enclosure illumination system 8 includes a light 14 mounted on the light module 10. When external light impinges upon solar battery 16, solar battery 16 generates a current, a portion of which is directed to rechargeable batteries B1–B4, and a portion of which is utilized for preventing light 14 from actuating under predetermined conditions. When the light impinging upon solar battery 16 is of an intensity satisfying a minimum threshold, light 14 is prevented from actuating. Thus, when external light impinges upon solar battery 16, for example, during the daytime, light 14 is prevented from being in the actuated state.

FIG. 4 is a bottom perspective view of the enclosure illumination module 10. As shown, system 10 includes light 14 and motion sensor 18. Motion sensor 18 detects the displacement of door 13, in the example of mailbox 12 shown in FIGS. 1 and 2. In other forms of enclosures, such as an outhouse, motion sensor 18 may detect the motion of the opening or closing of the door, or may detect the presence of a person within the enclosure. Light 14 may be an LED, light bulb, or any other suitable form of illumination. The motion sensor 18 may be an infrared sensor, or any other suitable non-contact electronic means for sensing the opening of door 13, or the presence of a user within the enclosure, all of which are well-known in the art and commercially available.

When motion sensor 18 detects motion, either by detecting changes in ambient infrared radiation, or through other means, a signal is generated and transmitted to light 14. Responsive to the signal generated by motion sensor 18, light 14 is actuated. However, if external light is impinging upon solar battery 16, solar battery 16 generates a signal which prevents the actuation of light 14.

Figure 7:
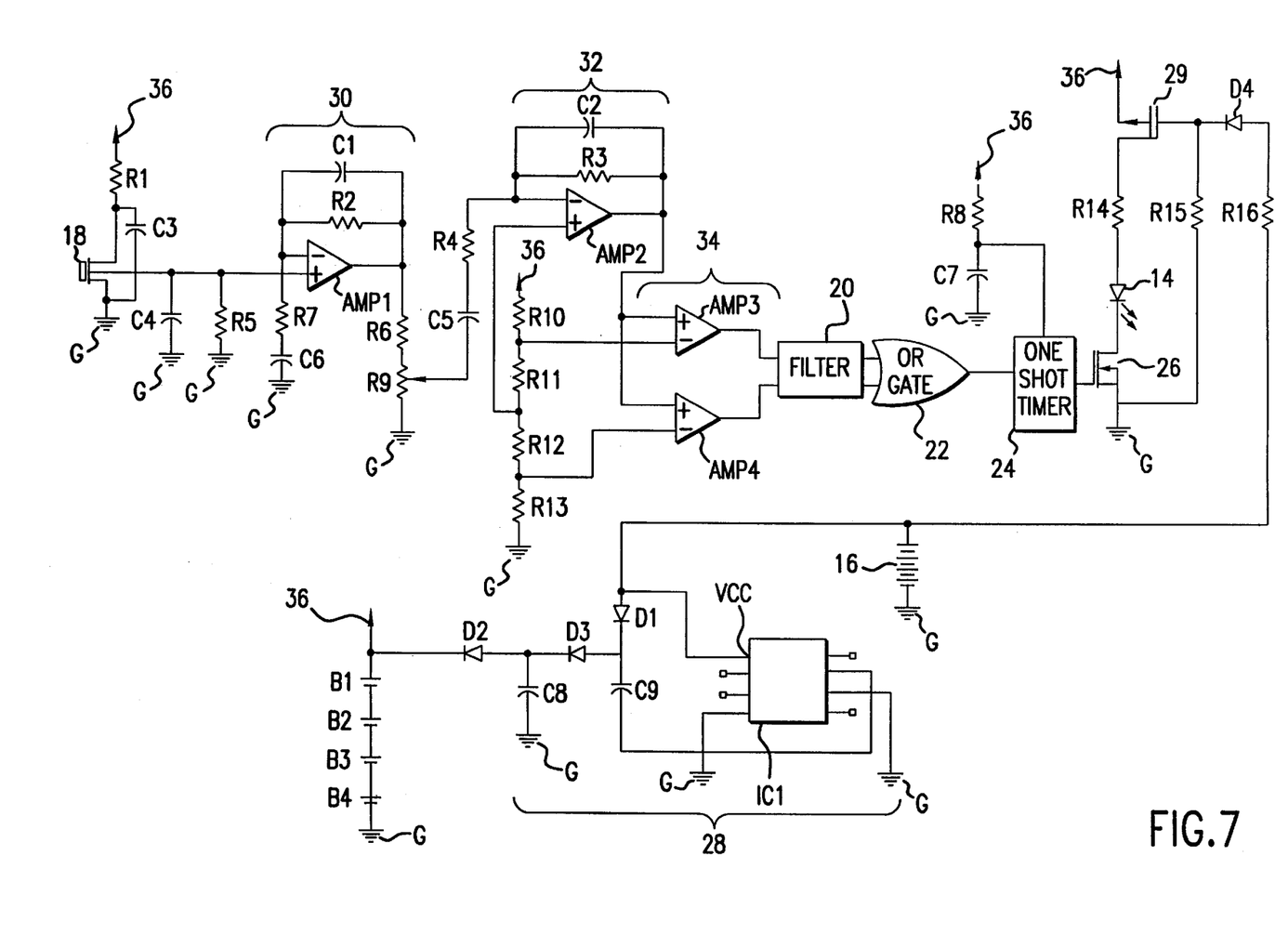
FIG. 7 is a schematic diagram of the circuitry within the enclosure illumination system.

FIG. 7 is a schematic diagram illustrating the circuitry of the enclosure illumination system 10. Under external light, either sunlight or other suitable illumination, solar battery 16 generates a signal, generally approximately 3 to 4 volts DC with a current of approximately 40 milliamps. This voltage is applied to light 14 to prevent light 14 from actuating even if sensor 18 generates a detection signal. Thus, light 14 will not actuate when the module 10 is in direct sunlight or under sufficient external illumination.

The voltage from solar battery 16 is also applied to a voltage doubler circuit 28. Voltage doubler circuit 28 comprises integrated circuit IC1, diodes D1 and D3, and capacitors C8 and C9. The voltage doubler circuit 28 provides approximately 4 to 6 volts for the charging of rechargeable batteries B1–B4. The rechargeable batteries B1–B4 may be nickel cadmium AA style rechargeable batteries or some like battery system. The voltage doubler circuit 28 serves as a charge pump type of voltage doubler. Integrated circuit IC1 contains an oscillator and switches for charging batteries B1–B4.

When voltage is applied to the VCC pin of IC1, its internal oscillator closes a charging switch to ground G for half of the oscillator cycle providing a charging path for capacitor C9 through diode D1. At this time, diode D3 is reverse biased and does not conduct current. At the end of the half cycle, capacitor C9 is charged to a voltage of (VCCV−VD), where VCCV represents the voltage applied to the VCC pin of IC1 and VD is the voltage drop across the diode D1. At this time, the charging switch is opened and another switch closes, connecting the negative side of capacitor C9 to pin VCC.

The negative side of capacitor C9 is then electrically connected to pin VCC through the internal switch of IC1, thus the junction of diodes D3 and D1 rests at a voltage of (VCCV+(VCCV−VD). This causes diode D1 to be reverse biased and diode D3 to be forward biased, which allows capacitor C8 to charge to a voltage of (2VCCV−2VD). At the end of the half cycle, the process is repeated, resulting in capacitor C8 being maintained at a voltage of (2VCCV−2VD) minus any discharge current through diode D2.

Voltage is applied to the rechargeable batteries B1–B4 through diode D2 until they are charged to the voltage level provided at the output of diode D2. When the output of the solar battery 16 drops to a level that is insufficient to charge batteries B1–B4, diode D2 is reverse biased which prevents the batteries B1–B4 from discharging back into the voltage doubler circuiry 28, which would result in an increased drain on batteries B1–B4. The batteries provide power to line 36, which is the power for the sensing circuitry and light 14 when the solar battery 16 is no longer providing power.

The opening of door 13 of mailbox or housing 12 is detected by motion sensor 18. The motion sensor 18 may be an infrared type sensor. When this type of sensor is used, and a person or body part enters the field of view of sensor 18, the infrared radiation given off by the body is picked up by the sensor and converted into a discharge pulse.

Filtered power is supplied to sensor 18 from path 36 through resistor R1 and capacitor C3. Capacitor C4 provides some filtering to remove noise from the output of sensor 18. Additionally, resistor R5 provides a reference ground for the amplifier circuit 30. The output pulse of sensor 18 is applied to differential amplifier 30. The differential amplifier 30 is formed of amplifier AMP1, resistor R2, capacitor C1, resistor R7 and capacitor C6 with AMP1, R2 and C1 being coupled in parallel relation, as shown. The gain of the differential amplifier 30 is (1+(R2/R7)) and is typically set for a voltage gain of approximately 75. Capacitors C1 and C6 provide filtering and AC coupling to the sensor 18 so that amplifier 30 will only respond to impulses from sensor 18 and not the constant DC offset voltage associated with its output.

When sensor 18 provides an impulse to the amplifier 30, amplifier 30 increases the pulse by its gain factor resulting in a large voltage pulse at its output. The output pulse is applied to a voltage divider network comprising resistor R6 and potentiometer R9. R9 serves as a sensitive decontrol to the next amplifier stage. The voltage divider network is used to control how far a body has to be from the sensor 18 in order to cause the circuit to turn on light 14. The voltage divider network further helps to prevent false triggering of the circuit due to high levels of background infrared radiation which would result in shortened battery life between charges.

The output from the voltage divider network is applied to another differential amplifier stage 32, which is formed of amplifier AMP2, resistor R3, capacitor C2, resistor R4, and capacitor C5 with AMP2, R3 and C2 being coupled in parallel relation to each other. Second stage amplifier 32 operates in a similar manner to the first stage amplifier 30 with a gain of (1+(R3/R4)). The voltage gain of this stage is also set at approximately 75.

A DC offset reference voltage is applied to the second stage amplifier 32 from the voltage divider formed of resistors R10, R11, R12, and R13. The purpose of this offset is the amplifier output normally rests inside the voltage trip points of the window comparator 34 made up of amplifiers AMP3 and AMP4. The voltage trip points of window comparator 34 are also set by the voltage divider formed of resistors R10, R11, R12, and R13. With all of these reference voltages coming from the same voltage divider, the signal ratios driving the comparator circuit will remain constant with varying battery voltage and will not result in false trips which results in wasted battery power.

The output of window comparator 34 is fed through a filter circuit 20 to further reduce false trips. The output of the filter goes to an OR gate 22 so that if either of the outputs of the comparators goes to path 36 due to an impulse from the sensor 18, one-shot timer 24 will be tripped.

The one-shot timer circuit 24 determines how long the light will be turned on once sensor 18 has detected a body. The duration is determined by the charge and discharge time of resistor R8 and capacitor C7 and may be made shorter or longer by decreasing or increasing the value of resistor R8.

Once triggered, the one-shot timer 24 turns transistor 26 "on", which provides a current path to ground from path 36 through transistor 29, resistor R14 and LED 14, which causes LED 14 to illuminate. If the one-shot timer completes its timing period and another pulse is generated by sensor 18, the timer will again turn "on" transistor 26 resulting in LED 14 turning on again.

To prolong battery life, transistor 29 is biased off by voltage supplied by the solar battery 16 through resistor R16 and diode D4, which will prevent LED 14 from illuminating. When the ambient light decreases, which causes the output of solar battery 16 to decrease, transistor 29 will be biased "on" by resistor R15 which will then allow LED 14 to illuminate.

In use, the enclosure illumination module 10 is installed on an enclosure, represented by mailbox or other housing 12 in FIGS. 1 and 2. When external light impinges upon solar battery 16 of system 10, the solar battery 16 generates a current which prevents the actuation of light 14. Solar battery 16 also generates a current for the recharging of rechargeable batteries B1–B4.

When no external light impinges upon solar battery 16, such as at night, for example, light 14 is not prevented from actuating. When door 13 is opened, sensor 18 detects the motion, either through a change in the ambient infrared light, or through other suitable means. Sensor 18 generates a signal which actuates light 14. As shown in FIG. 7, the signal passes through a one-shot timer 24, thus keeping light 14 actuated for a set period of time. The set period of time for one-shot timer 24 may be varied depending on the resistance of resistor R8. The set period of time may be chosen by the user for the specific application of the enclosure illumination system.

Light 14, which is powered by rechargeable batteries B1–B4, may be actuated continuously by the continuous tripping of sensor 18. If sensor 18 is not tripped after one-shot timer 24 ceases generating power to light 14, light 14 will remain in an "off" state.

A second timing circuit (not shown) may also be utilized. The second timer would act as a reset delay timer. Once an actuation pulse is sent by sensor 18, timer 1 is set to an "on"

condition and times down to zero and then shuts off the light element 14. Simultaneously, the secondary timer, the "reset delay" timer, would be set to an "on" condition preventing the restarting of the primary timer until the secondary timer times down to zero. Thus, a user may set a secondary time period during which light 14 would be prevented from actuating.

The enclosure illumination module 10 may be easily installed within an enclosure, such as mailbox or other housing 12. As shown in FIG. 1, housing 12 has a retaining hole formed through an upper section thereof. The retaining hole has a diameter approximately equal to that of the lower projecting member 19 of the enclosure illumination system 10, as shown in FIG. 2.

Upper member 17 of module 10, as shown in FIG. 2, is contoured to fit along the upper surface of housing 12. Alternatively, upper member 17 can have a bottom portion or base with a geometry shaped to accept an elastomeric gasket. The elastomeric gaskets can be sized and shaped to fit to the bottom portion of upper member 17 such that many different geometries of enclosure roof walls can be adapted for sealing and mounting of module 10. Additionally, the underside of the upper member 17, may have an adhesive layer 40. The adhesive 40 may be a pressure-sensitive adhesive foam, or other suitable adhesive for adhering the upper member 17 of the enclosure illumination module 10 to the upper surface of housing 12. As shown in FIG. 4, the adhesive layer 40 may encircle the lower projecting member 19. Adhesive layer 40 provides both a fastening means and a sealing means to preclude water infiltration within the enclosure.

Alternatively module 10 may be fixedly secured to housing 12 through bolts, screws, or other fastening devices. Alternatively, projection 19 could carry an external thread on its perimeter, such that once inserted into the subject enclosure, a retaining member (with an internal thread) could be assembled over projection 19 and torqued to securely affix the enclosure illumination system 10 to the subject enclosure.

Figure 5:
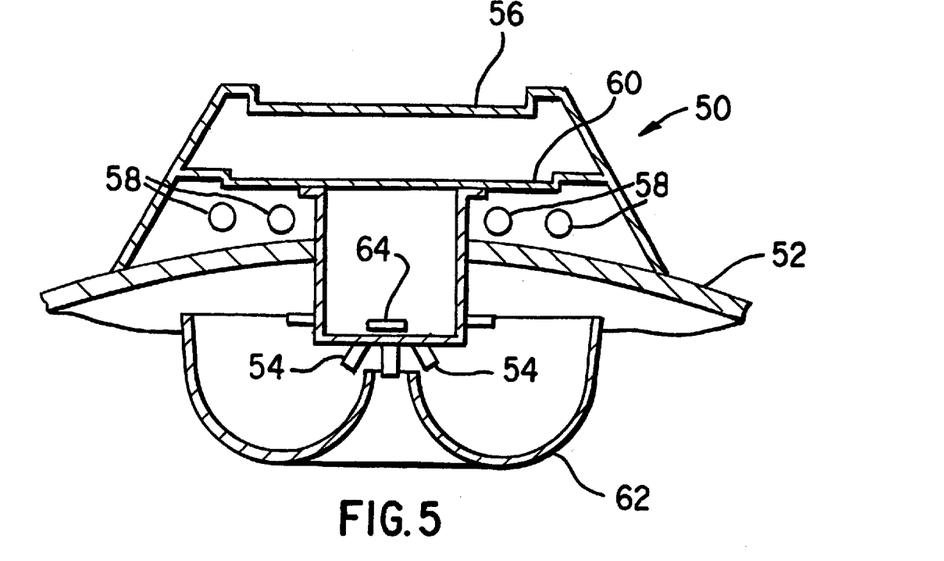
FIG. 5 is an elevational cut-away view of the enclosure illumination module.
Figure 6:
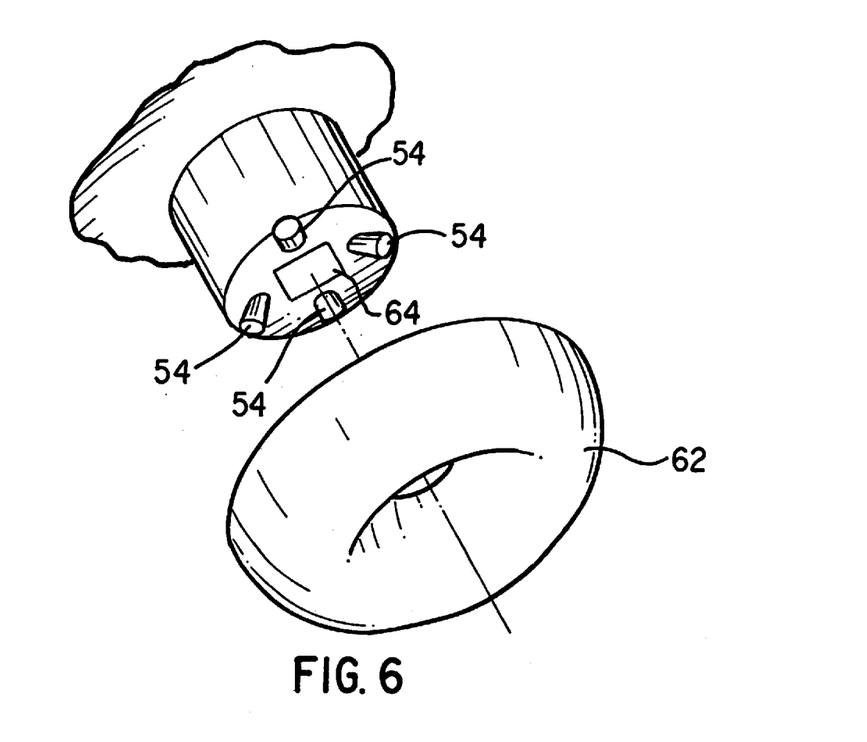
FIG. 6 is an exploded, bottom view of the enclosure illumination module.

FIGS. 5 and 6 illustrate another embodiment of the enclosure illumination module 50. As shown in the sectional view of FIG. 5, the enclosure illumination system 50 includes solar battery panel 56, rechargeable batteries 58, circuit board 60, sensor element 64, and lighting elements 54.

As shown in the bottom perspective view of FIG. 6, the lighting elements 54 of the enclosure illumination system 50 are mounted annularly on the bottom of the lower projecting member of the module 50. Although four LEDs are illustrated in FIG. 6, any number of lighting elements may be used, and the LEDs 54 may be replaced by light bulbs or other suitable lighting elements.

Sensor 64, similar to sensor element 18 of FIGS. 2 and 4, is positioned in the center of the underside of the lower projecting member. Thus, LEDs 54 encircle the sensor element 64. As shown in the Figures, a lens 62 is provided for covering the light elements 54. Lens 62 acts to diffuse the light generated by LEDs 54 and to protect them from external sources. As shown in FIG. 6, lens 62 has an opening through the center thereof, allowing sensor 64 to remain unobstructed. Alternatively, the center portion of lens 62 could be shaped to provide a lens effect to focus the sensor viewing range for enclosures of varying dimensions; e.g., height. Lens component 62 may also carry an internal threaded portion, which could match with an external threaded portion on projection 66. Once installed through the hole provided in enclosure 52, lens 62 would screw onto projection 66 to affix enclosure illumination system 50 to enclosure 52.

As shown in FIG. 5, the enclosure illumination system 50 may also include a layer of adhesive 52 along the lower surface of the upper member. The adhesive 52 may be pressure-sensitive adhesive foam, or any other suitable adhesive for mounting the system 50 on an enclosure.

The enclosure illumination modules 10 and 50 may be used on a mailbox, outhouse, refrigerator, tool shed, or any other enclosure requiring interior illumination. The system is well-suited towards illuminating enclosures located in an external environment at night. However, the enclosure illumination modules 10, 50 may be mounted on interiorly located enclosures, such as refrigerators and cabinets.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, proportional quantities of the elements shown and described may be varied, all without departing from the spirit or scope of the invention as defined in the appended Claims.

What is claimed is:

1. An enclosure illumination system comprising:
    a housing;
    an enclosure illumination module secured to said housing, said enclosure illumination module including,
        a solar battery for charging at least one rechargeable battery;
        a light sensing circuit for sensing environmental light external to said housing electrically coupled to said solar battery and said rechargeable battery, said light sensing circuit developing a light sensing electrical signal when said light impinges on said solar battery;
        a sensor for sensing motion within said housing;
        a light element electrically coupled to said rechargeable battery; and,
        a timing circuit electrically coupled to said light element, said light element being actuated for a fixed period of time responsive to signals generated by said sensor when there is no light sensing signal generated by said light sensing circuit.

2. The enclosure illumination system of claim 1 wherein said housing is an outhouse.

3. The enclosure illumination system of claim 1 wherein said housing is a mailbox.

4. The enclosure illumination system of claim 1 wherein said sensor comprises an infrared sensor element.

5. The enclosure illumination system of claim 1 wherein said light sensing circuit prevents actuation of said light element when said environmental light has an intensity greater than a fixed threshold intensity.

6. The enclosure illumination system of claim 1 wherein said light element is a light emitting diode.

7. The enclosure illumination system of claim 1 wherein said solar battery and said rechargeable battery electrically communicate with one another through a voltage doubler circuit.

8. The enclosure illumination system of claim 1 wherein said rechargeable battery is a nickel-cadmium battery.

9. The enclosure illumination system of claim 1 wherein said solar battery is formed from at least one solar cell.

10. The enclosure illumination system of claim 1 wherein said fixed period of time of said timing circuit may be varied by a user.

11. An enclosure illumination system comprising:
a housing having a wall, said wall having a retaining opening formed therethrough;
an enclosure illumination module having an upper member secured to said housing, said enclosure illumination module including,
   a solar battery for charging at least one rechargeable battery, said solar battery being mounted on said upper member of said enclosure illumination module;
a light sensing circuit for sensing environmental light external to said housing electrically coupled to said solar battery and said rechargeable battery, said light sensing circuit developing a light sensing electrical signal when said light impinges on said solar battery;
a sensor for sensing motion within said housing;
at least one light element electrically coupled to said rechargeable battery;
a lower projecting member projecting from said upper member, said sensor and at least one light element being mounted thereon, said lower projecting member being received within said retaining opening of said housing;
an adhesive layer affixed to a bottom surface of said upper member for adhering said bottom surface of said upper member to said housing when said lower projecting member is received within said retaining opening; and,
a timing circuit electrically coupled to said light element, said light element being actuated for a fixed period of time responsive to signals generated by said sensor when there is no light sensing signal generated by said light sensing circuit.

12. The enclosure illumination system of claim 11 wherein said housing is an outhouse.

13. The enclosure illumination system of claim 11 wherein said adhesive layer forms a waterproof seal between said enclosure illumination module and said housing.

14. The enclosure illumination system of claim 11 wherein said sensor comprises an infrared sensor element.

15. The enclosure illumination system of claim 11 wherein said solar battery generates said light responsive current when environmental light impinging upon said solar battery has an intensity greater than a fixed threshold intensity.

16. The enclosure illumination system of claim 11 wherein said light element is a light emitting diode.

17. The enclosure illumination system of claim 11 wherein said solar battery and said rechargeable battery electrically communicate with one another through a voltage doubler circuit.

18. The enclosure illumination system of claim 11 wherein said rechargeable battery is a nickel-cadmium battery.

19. The enclosure illumination system of claim 11 wherein said solar battery is formed from at least one solar cell.

20. The enclosure illumination system of claim 11 wherein said fixed period of time of said timing circuit may be varied by a user.

* * * * *